July 2, 1968
H. L. REINSMA
3,390,922
TRACK PIN SEAL
Original Filed April 14, 1966
2 Sheets-Sheet 1
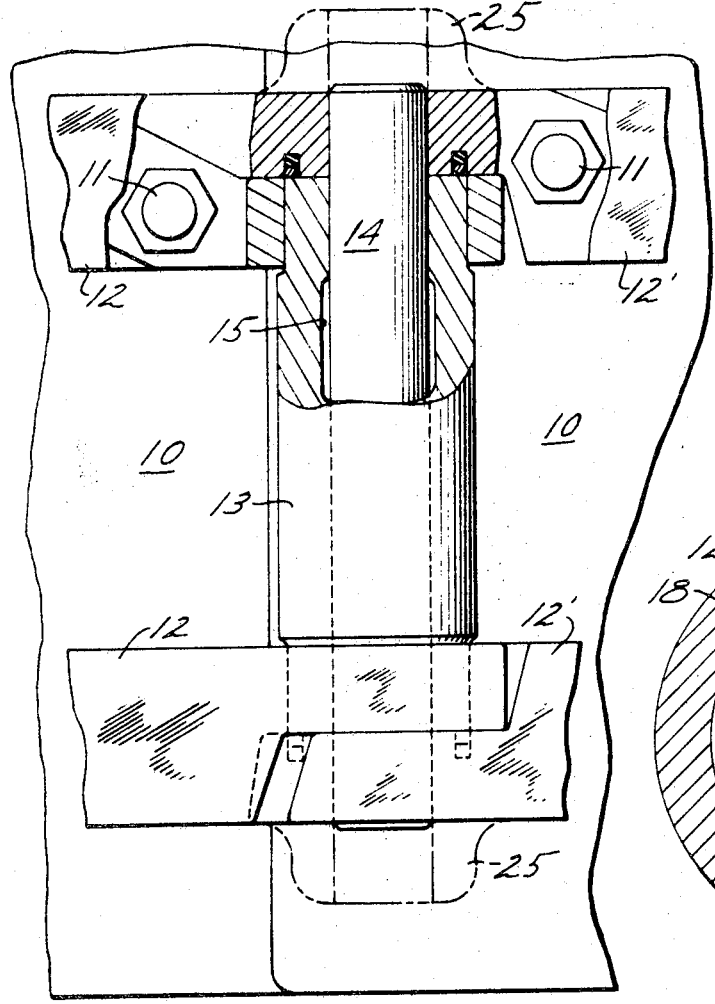
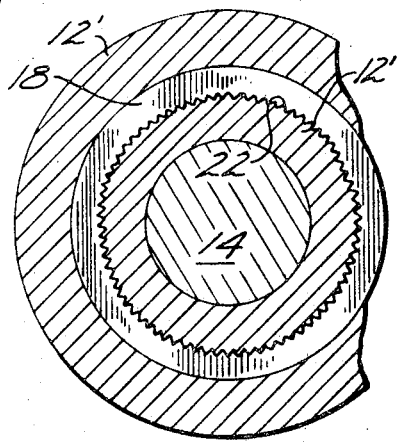
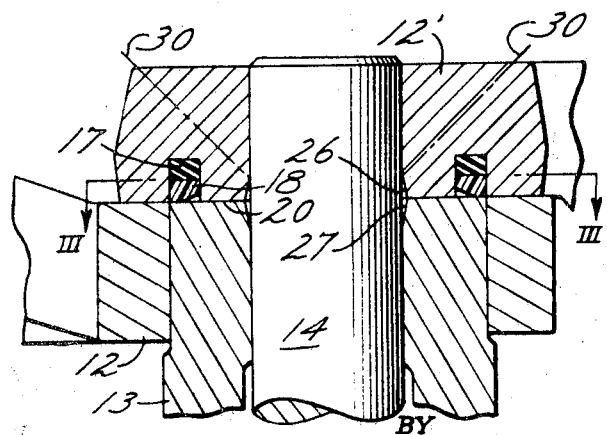
INVENTOR.
HAROLD L. REINSMA
BY
ATTORNEYS

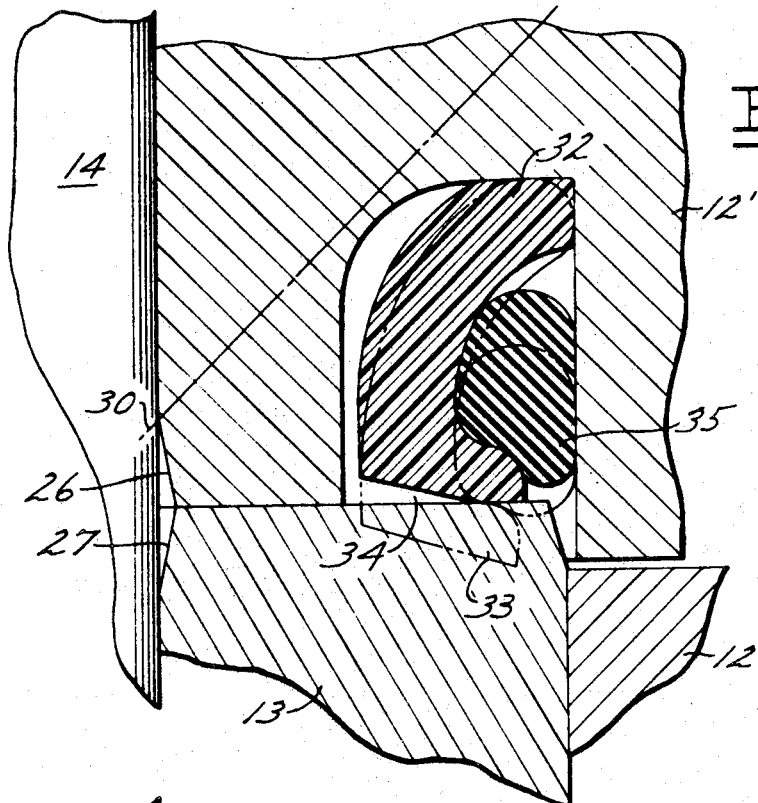
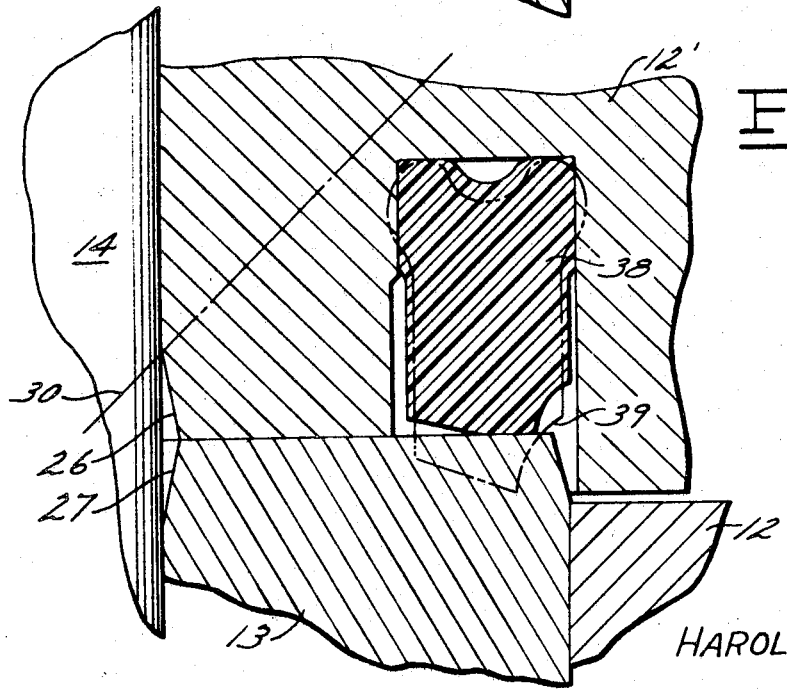

United States Patent Office 3,390,922
Patented July 2, 1968

3,390,922
TRACK PIN SEAL
Harold L. Reinsma, Peoria, Ill., assignor to Caterpillar Tractor Co., Peoria, Ill., a corporation of California
Original application Apr. 14, 1966, Ser. No. 542,675, now Patent No. 3,336,086, dated Aug. 15, 1967. Divided and this application May 22, 1967, Ser. No. 640,018
2 Claims. (Cl. 305—11)

ABSTRACT OF THE DISCLOSURE

A track pin seal between a track link and an end of a pin bushing which abuts the link having a resilient crescent-shaped seal element in a groove in the link and bearing against the end of a bushing in sealing relationship therewith.

---

This application is a division of my application Ser. No. 542,675 filed Apr. 14, 1966, now Patent No. 3,336,086, which application is a continuation-in-part of my earlier application Ser. No. 390,871 filed Aug. 20, 1964, now abandoned.

Two typical seals which have proven successful in use are shown in my assignees patents to Deffenbaugh No. 2,699,974 and to Simpson et al., No. 3,050,346. As shown in these patents, a conventional track is made up of pairs of links articulately connected at their ends by track pins and bushings. Two link ends which form the inner parts of a joint are pressed onto the bushing. The pin extends through the bushing and the other two link ends forming the outer parts of the joint are pressed onto the pin. The pin is rotatably fitted and lubricated in the bushing and seals are provided between the ends of the bushing and the outer link ends. Space for these seals is provided by forming counterbores in the outer link ends concentric with the bores which receive the ends of the pin. Since this tends to weaken the links and reduce the pin engaging and supporting area of the pin bore, it has been conventional practice to enlarge the ends of the links with a boss concentric to the bore and extending outwardly. These bosses increase the weight of the track and also sometimes interfere with track roller flanges after the roller treads have become worn.

It is the object of the present invention to improve on prior art types of seals for track pins, to provide a small low-cost but extremely effective seal and to enable reduction in size and overall weight of tracks without forfeiting strength.

Another object of the invention is to provide a sealing means disposed within a groove so small and so positioned in a track link that there is very little tendency to weaken the link where it is subjected to stresses in the area in which it embraces a track pin.

Further and more specific objects and advantages of the invention are made apparent in the specification wherein reference is made to the accompanying drawings.

In the drawings:

FIG. 1 is a fragmentary plan view of an endless track mechanism with parts in section to reveal the construction of the seal arrangement which embodies the present invention;

FIG. 2 is an enlarged fragmentary view in section of the hinge connection illustrated in FIG. 1;

FIG. 3 is a fragmentary sectional view taken on the line III—III of FIG. 2; and

FIGS. 4 and 5 are enlarged fragmentary views in section showing modified forms of the sealing means.

In FIG. 1 of the drawings, a portion of the endless track mechanism for a track-type tractor is illustrated as comprising track shoes 10, each of which is secured as by bolts 11 to pairs of spaced track links shown at 12 and 12'. The links 12 and 12' are made in identical pairs and in the joint shown the links 12 form the inner pair of the joint and the links 12' the outer pair. In the joint shown, the inner pair of links 12 is pressed onto the ends of a bushing 13 having an axial bore for the reception of a pin 14 forming a pivotal connection with the overlappng ends of the adjacent par of links 12'. The overlapping ends of the links 12' are formed with openings for the reception of the extending ends of the pin 14 which ends are pressed into these openings. The fit between the bushing 13 and pin 14 is sufficiently loose to permit hinging of the connected track parts as the track passes around the driving sprocket and idler wheels of the tractor (not shown).

A lubricant is provided in a space 15 between the pin and bushing and to prevent escape of this lubricant as well as to prevent the entry of dirt or abrasive substances, a seal is provided in the inner face of the outer end of each link 12' in a position to bear against the outer end of the bushing 13. The seal is contained in a narrow annular groove and comprises, in the form shown in FIG. 2, a ring of soft rubber-like material under compression shown at 17 and a ring 18 of a harder less elastic and more durable material in the face to face sealing contact with the end of the bushing 13. Polyurethane has been found a suitable material from which to form the ring 18.

One of the important distinctions between the seal of the present application and previously known track pin seals is that both rings 17 and 18 are considerably narrower than the end of the track pin bushing and can therefore be received in a very narrow annular groove. Since this groove is spaced outwardly with respect to the pin bore, a large annular area of contact 20 exists in the end of the bushing and the inner face of the link 12'. This area absorbs thrust caused by lateral forces to which the track is subjected. Furthermore, since the relatively small seal groove is spaced from the pin rather than adjacent the pin as in previously known seals, the pin bore is longer and provides greater support for the pin against the bending stresses to which it is subjected.

The seal ring 18 of FIG. 2 is preferably held against rotation in its groove and this may be accomplished in any conventional way as for example by broaching the inner annular wall of the groove to form serrations therein as illustrated at 22 in FIG. 3 interengageable with similar serrations in the ring.

The size and the position occupied by the groove which receives the seal element is of great importance and enables the use of track links which do not have pin bosses which are enlargements on the sides of the links represented in dotted lines at 25 in FIG. 1. These bosses were previously necessary on links with larger seal means such as shown in the Deffenbaugh patent referred to above, in which patent the bosses are indicated at 16 in FIG. 1. In the prior art where larger seal ring grooves interrupted the surface of the pin bore in the link, it was necessary to provide more extensive surface by the use of pin bosses. With the small groove of the present invention, sufficient surface is present to insure retention of the pin with a press fit. Furthermore, the location of this groove is such that it does not reduce the resistance of the link to stresses which result from a tendency of the pin to bend.

As shown in FIG. 2, chamfers are formed at the end of the pin bore as in the link as at 26 and at the end of the bushing bore as at 27. Such chamfers are also clearly shown in the enlarged views of FIGS. 4 and 5. The purpose of these chamfers is to facilitate assembling the pin into its press fit relationship with the link and its looser relationship with the bushing. The driving force of the tractor sprocket against the central area of the bushing 13 tends to bend the pin and exert very heavy loads on the link adjacent the pin bore. Breakage of the link due to such loads will occur generally at a somewhat conical shear plane represented in FIGS. 2, 4 and 5 by broken lines 30. This shear plane originates at the inner edge of the chamfer 26 and diverges outwardly at a 45° angle as it progresses toward the outer side of the link. As is apparent from the drawings, the seal ring groove is disposed entirely outside of the conical area defined by the shear plane and, therefore, does not interrupt this plane nor reduce the ability of the link to resist forces caused by bending of the track pin.

In the enlarged views of FIGS. 4 and 5, the track parts are given the same numbers and modified forms of the seal elements are shown. The form of seal illustrated in FIG. 4 comprises a single ring 32 of arcuate or crescent-shaped cross-section with a somewhat wider portion at its sealing edge and this ring is wider than the depth of the seal groove so that it is forced from a normal position represented in broken lines at 33 to the slightly distorted position shown in full lines so that a narrow sealing band is provided at the outer diameter of this wider portion. The sealing band is formed by a part of an angular face creating a tapered space 34 which tends to cause lubricant to flow toward the seal surface. A softer rubber O-ring shown at 35 is preferably employed with the crescent-shaped seal principally for the purpose of filling the area between the outer periphery of the seal and the wall of the groove to prevent this area from becoming packed with dirt or other foreign matter.

The seal of FIG. 5 is a single annular member 38 having a normal cross-section shown in broken lines at 39 and reduced in size upon insertion into the seal groove so that it is retained therein by friction and has a resilient tendency to maintain contact of the sealing surfaces. In both of the seals shown in FIGS. 4 and 5, the construction of the seal ring produces a relatively light face load which lengthens the life of the seal. The life of the seal is also prolonged by the angular face which tends to direct lubricant toward the sealing surfaces.

I claim:

1. In a track link having a bore for press fit reception of a track pin and having an inner face adjacent the bore for abutment with an end of a bushing which embraces the pin, said inner face of the link having a groove spaced from and concentric to the bore, seal means in said groove comprising a resilient ring of crescent shaped cross section and distorted to be contained entirely within the groove and to provide sealing pressure to a sealing end area in contact with the end of the bushing, the end of the resilient ring in sealing contact with the bushing being inclined with respect to the end of the bushing so that a portion only of the end is distorted under light pressure into sealing contact throughout an annular band, and a ring of relatively soft material contained in the groove within the concavity of the crescent and a wall of the groove to act as a filler and auxiliary seal.

2. A seal between two flat relatively rotatable abutting surfaces having concentric bores which define an area to be sealed against loss of lubricant and entry of foreign matter, one of said faces having an axially extending groove spaced from and concentric to the bore, seal means in said groove comprising a resilient ring of crescent shape cross section and distorted to be contained entirely with the groove and to provide sealing pressure to a sealing end area in contact with the other of said abutting surfaces, the end of the resilient ring being inclined with respect to said other surface so that a portion only of the end is distorted under light pressure into sealing contact throughout an annular band, and a ring of relatively soft material contained in the groove within the concavity of the crescent and a wall of the groove to act as a filler and auxiliary seal.

References Cited

UNITED STATES PATENTS

| | | | |
|---|---|---|---|
| 629,515 | 7/1898 | MacDonald | 74—257 |
| 1,289,408 | 12/1918 | Davis | 305—14 |
| 2,168,053 | 8/1939 | Starr. | |
| 2,294,105 | 8/1942 | Wallgren | 277—96 |
| 2,509,436 | 5/1950 | Isenbarger. | |
| 2,699,974 | 1/1955 | Deffenbaugh | 305—11 |
| 2,882,103 | 4/1959 | Johnson | 305—58 |
| 3,195,421 | 7/1965 | Rumsey | 277—95 X |
| 3,336,086 | 8/1967 | Reinsma | 305—11 |

RICHARD J. JOHNSON, *Primary Examiner.*